Patented Mar. 1, 1938

2,109,599

UNITED STATES PATENT OFFICE 2,109,599

PLASTIC COMPOSITIONS CONTAINING GELATINIZED NITROCELLULOSE

Harold James Tattersall, Ardrossan, Scotland, assignor to Imperial Chemical Industries Limited, a corporation of Great Britain No Drawing. Application December 3, 1935, Serial No. 52,727. In Great Britain December 3, 1934

4 Claims. (Cl. 106—37)

The present invention relates to plastic compositions containing gelatinized nitrocellulose, and particularly to plastic compositions resembling Celluloid in their properties and uses. The invention relates especially to substantially colourless transparent compositions which may be produced in sheet form suitable for use in the manufacture of safety glass.

Celluloid as ordinarily manufactured is characterized by a high degree of toughness and a high tensile strength, although it is not readily flexible and it loses its toughness and becomes relatively brittle at reduced temperatures. An increase in the proportion of plasticizer above that commonly employed renders the product softer and less tough. As regards other physical and chemical properties it is well known also that Celluloid is highly inflammable and that on prolonged exposure to light it darkens and deteriorates. Attempts have been made to produce Celluloid-like plastics of improved properties by employing other plasticizers in place of camphor but the products have not shown a completely satisfactory degree of light stability together with a satisfactory toughness and flexibility.

Within recent years there have become available plastic compositions containing polymerized unsaturated organic compounds, and since some of these compositions have a very high degree of transparency and freedom from colour and are remarkably stable on exposure to light, it has been proposed to employ certain of them in the manufacture of safety glass.

These compositions however suffer from the disadvantages that in the absence of plasticizers the polymers are brittle at ordinary temperatures, and that when the polymers are associated with sufficient plasticizer to render them sufficiently flexible the resulting compositions are not entirely satisfactory in respect of their toughness.

An object of the present invention is the production of improved plastic compositions having good stability towards light and heat and also characterized by a high degree both of flexibility and of toughness.

According to the present invention a plastic composition comprises nitrocellulose, polymerized methyl methacrylate and a common plasticizer therefor, the proportion of polymerized methyl methacrylate lying between about 20% and 50% by weight of that of the nitrocellulose and the proportion of plasticizer being such that the composition is completely gelatinized and homogeneous. It is also necessary that the proportion of plasticizer should lie within certain limits in order to confer on the composition the desired characteristics of flexibility and toughness, and, although this range varies with the proportion of polymer to nitrocellulose and with the nature of the plasticizer, it is frequently convenient to employ a weight of plasticizer somewhat less than or approximately equal to that of the nitrocellulose. In general, too small a proportion of plasticizer results in a composition which is too brittle, i. e. insufficiently flexible, while on the other hand too large a proportion of plasticizer causes a falling off in the toughness.

The toughness of the plastic compositions and its relation to the flexibility may be compared by determining the tensile strength and ease of bending of a number of sheets of the material. Instead of the direct measurement of the tensile strength, however, other methods of determining the toughness may be used. Thus, for example, if the material is intended for use in the manufacture of safety glass the resistance to shock of the laminated product is a measure of the desired characteristic of toughness in the plastic composition.

The plastic compositions of the present invention are suitably prepared by working the ingredients together with the aid of hot rolls, but a preliminary distribution of the ingredients is conveniently effected in a kneading machine or the like. In effecting the gelatinization it is often convenient to employ a small proportion of an easily volatile solvent or a volatile material having a partial solvent effect facilitating gelatinization at raised temperatures. The volatile medium is removed by evaporation in the subsequent treatment on the hot rolls. As suitable solvents there may be employed acetone, ethyl acetate, or the like. The preliminary distribution of the ingredients may be effected with the aid of a liquid, such as alcohol, which facilitates the distribution at ordinary temperatures and the gelatinization when the material is transferred to hot rolls.

When the quantity of plasticizer employed is sufficient to enable a volatile solvent to be dispensed with, it may be desirable to employ the methyl methacrylate polymer in the form of a product resulting from polymerization of the monomer in the presence of at least a portion of the plasticizer, or preferably in the form of a gel product resulting from the polymerization of the methyl methacrylate in the presence of the whole of the plasticizer to be employed.

The type of nitrocellulose used may be industrial nitrocellulose, preferably of the kind characterized by medium viscosity such as is used for the manufacture of ordinary Celluloid. The properties of the final plastic may be modified to some extent within the limits of the invention by choosing nitrocellulose of somewhat different viscosities. The nitrocellulose may be employed damped with water, alcohol or other volatile liquids.

As mutual plasticizers the liquid lower dialkyl phthalates are particularly suitable on account of their exceedingly good plasticizing action on both nitrocellulose and polymerized methyl methacrylate, but other plasticizers such as lower dialkyl tartrates and lower alkyl-cyclohexyl oxalates and other plasticizers are available.

By the term "lower di-alkyl phthalate" I mean a normal phthalate of one or more lower saturated monohydric aliphatic alcohols containing not more than six carbon atoms in the molecule.

The composition may be converted into sheets from the crepe obtained from the rolls in order to form a material suitable for use for the manufacture of safety glass. This may be carried out for instance by pressing the crepe, which is usually opaque or translucent, into the form of a block at a raised temperature and this block may be sheeted without any maturing process if the working on hot rolls has been sufficiently thorough to remove the volatile solvent. Alternatively if the crepe is free from volatile solvent it may be subjected to pressure between polished surfaces at a raised temperature in order to prepare Celluloid-like sheets, or, if a laminated glass is to be prepared, the crepe may even be pressed directly between suitable cemented glass sheets at a raised temperature.

The invention is further illustrated by the following examples, in which the parts are parts by weight:

Example 1

36 parts of methyl methacrylate were polymerized in known manner with the aid of benzoyl peroxide and in the presence of 94 parts of di-n-butyl phthalate. Into the resulting elastic gel there was incorporated 100 parts dry weight of alcohol-wet Celluloid nitrocotton, the incorporation being effected in a Werner Pfleiderer incorporating machine at room temperature and with the addition of a small proportion of acetone. A homogeneous plastic composition was obtained which was worked on hot rolls until the solvent was evaporated. The composition was then converted into the form of sheets of suitable thickness and pressed between plates of glass covered with a suitable cement.

Example 2

150 parts spirit-wet nitrocotton (100 parts dry nitrocotton) were kneaded with 90 parts dibutyl phthalate in a kneading machine until a stiff dough was formed. 40 parts of granular polymethyl methacrylate containing 10% dibutyl phthalate were then added, and incorporated in the mass, which was finally homogenized on hot rolls.

Example 3

250 parts water-wet nitrocellulose (150 parts dry nitrocellulose) and 130 parts of a jelly prepared by polymerizing 36 parts of methyl methacrylate in solution in 94 parts dibutyl phthalate, were treated with 120 parts of industrial spirit and kneaded in a Werner Pfleiderer machine. The resulting thick cream was filtered at 3,000 lb. per square inch pressure at ordinary temperature through a Celluloid filter. The filtrate was fed to hot rolls, on which it was rolled until all solvent was driven off, and was then pressed between polished metal plates to produce a polished sheet suitable for safety glass manufacture.

Example 4

36 parts methyl methacrylate were polymerized in known manner with the aid of benzoyl peroxide and in the presence of 94 parts di-n-amyl phthalate. The resulting gel is kneaded with 100 parts dry weight water-wet Celluloid nitrocotton and 80 parts alcohol in a Werner Pfleiderer machine at ordinary temperature. The resulting cream is filtered as in Example 3 and is fed to hot rolls on which it is rolled until substantially all the solvent has been driven off, the temperature of the rolls being about 100° C. The crepe from the rolls may be pressed between polished metal plates in order to produce a polished sheet for safety glass manufacture. Thin sheets of the material may also be employed for wrapping purposes.

According to one particular form of the invention as hereinbefore described the plastic composition comprises nitrocellulose and a gel product obtained by polymerizing methyl methacrylate in the presence of an amount of a liquid lower dialkyl phthalate approximately equal to that of the nitrocellulose, the total amount of the gel product lying between 1 and 1.5 times that of the nitrocellulose.

In carrying out the general form of the invention with the aid of dibutyl phthalate as plasticizer we have found the following proportions of ingredients to be convenient. When employing an amount of methyl methacrylate equivalent to 30% of the nitrocellulose the minimum proportion of plasticizer is about 50% of the nitrocellulose and the maximum proportion about 120%. Similarly, when employing 50% methyl methacrylate the minimum and maximum proportions of plasticizer are 70% and 150%, respectively.

The products of the present invention may be formed into substantially colourless sheets which have the remarkable property of possessing a greater degree of toughness at ordinary or somewhat reduced temperatures than sheets of the same flexibility and comprising either nitrocellulose alone or methyl methacrylate alone. Furthermore, as compared with Celluloid they are less inflammable, are less liable to explosive decomposition, and possess in general better heat and light resistant properties.

I claim:

1. A method of preparing a plastic composition which consists in working together with the aid of hot rolls nitrocellulose, polymerized methyl methacrylate, and dibutyl phthalate, the proportion of polymerized methyl methacrylate being 30% by weight of the nitrocellulose, and the proportion of dibutyl phthalate being 50–120% by weight of the nitrocellulose.

2. A method as recited in claim 1 in which the methyl methacrylate is employed in the form of a product obtained by polymerizing monomeric methyl methacrylate in the presence of at least a portion of the dibutyl phthalate.

3. A plastic composition comprising nitrocellulose, polymerized methyl methacrylate, and a liquid lower di-alkyl phthalate as a common plasticizer therefor, the polymerized methyl methacrylate being 20–50% by weight of the nitrocellulose and the plasticizer being about 100% by weight of the nitrocellulose.

4. A plastic composition comprising nitrocellulose, polymerized methyl methacrylate, and dibutyl phthalate as a common plasticizer therefor, the polymerized methyl methacrylate being 20–50% by weight of the nitrocellulose and the plasticizer being 50–120% by weight of the nitrocellulose.

HAROLD JAMES TATTERSALL.